United States Patent
Haulick et al.

(10) Patent No.: US 8,204,248 B2
(45) Date of Patent: Jun. 19, 2012

(54) ACOUSTIC LOCALIZATION OF A SPEAKER

(75) Inventors: Tim Haulick, Blaubeuren (DE);
Gerhard Uwe Schmidt, Ulm (DE);
Markus Buck, Biberach (DE); Tobias Wolff, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 1098 days.

(21) Appl. No.: 12/104,836

(22) Filed: Apr. 17, 2008

(65) Prior Publication Data

US 2008/0285772 A1 Nov. 20, 2008

(30) Foreign Application Priority Data

Apr. 17, 2007 (EP) .................... 07007817

(51) Int. Cl.
*H04R 3/00* (2006.01)
(52) U.S. Cl. ............. 381/92; 381/56; 381/58; 381/94.2; 381/122
(58) Field of Classification Search .................... 381/56, 381/58, 92, 94.2, 122
See application file for complete search history.

(56) References Cited

U.S. PATENT DOCUMENTS

| | | | |
|---|---|---|---|
| 2005/0271220 A1* | 12/2005 | Bathurst et al. | 381/92 |
| 2007/0147634 A1* | 6/2007 | Chu | 381/92 |
| 2008/0063224 A1* | 3/2008 | De Klerk | 381/304 |

FOREIGN PATENT DOCUMENTS

| | | |
|---|---|---|
| EP | 1020068 B1 | 9/1998 |
| EP | 1 544 635 A1 | 6/2005 |
| EP | 1 551 205 A1 | 7/2005 |
| FR | 2817973 A1 | 6/2002 |
| JP | 2002156451 A1 | 5/2002 |
| WO | WO 2006/011650 A2 | 2/2006 |

OTHER PUBLICATIONS

Van Veen, B. D. et al. "Beamforming: a versatile approach to spatial filtering", *IEEE ASSP Magazine*, vol. 5, No. 2, pp. 4-24, Apr. 1988.
Herbordt, W. et al. Chapter 6, Adaptive Beamforming for Audio Signal Acquisition, *Adaptive Signal Processing: Applications to Real-world Problems*, Springer, Berlin, p. 155-194, 2003.
Hänsler, E. et al. Chapter 9, Echo Cancellation, "*Acoustic echo and noise control: a practical approach*" John Wiley & Sons, Hoboken, NJ (USA), pp. 163-175, 2004.

* cited by examiner

*Primary Examiner* — Wai Sing Louie
(74) *Attorney, Agent, or Firm* — Sunstein Kann Murphy & Timbers LLP

(57) ABSTRACT

A system locates a speaker in a room containing a loudspeaker and a microphone array. The loudspeaker transmits a sound that is partly reflected by a speaker. The microphone array detects the reflected sound and converts the sound into a microphone signal. A processor determines the speaker's direction relative to the microphone array, the speaker's distance from the microphone array, or both, based on the characteristics of the microphone signals.

14 Claims, 6 Drawing Sheets

ACOUSTIC LOCALIZATION OF A SPEAKER

FIELD OF INVENTION

1. Priority Claim

This application claims the benefit of priority from European Patent Application EP 07007817.5, filed Apr. 17, 2007, which is incorporated by reference.

2. Technical Field

The invention relates to localization of speakers, in particular, the localization of a speaker through a transmission and/or reception of acoustic signals.

BACKGROUND OF THE INVENTION

The localization of one or more speakers, such as communication parties, may affect electronically mediated communications. The intelligibility of speech transmissions to a remote party may depend on a localization of the speaker. If localization of a speaker fails, the transmitted speech signal may be difficult to detect and may be corrupted by undesired noise.

SUMMARY

A method locates a speaker in a room containing a loudspeaker and a microphone array. The loudspeaker emits a sound that is partly reflected by the speaker. The microphone array detects the sound reflected by the speaker and converts the sound into a microphone signal. A processor determines the speaker's direction with respect to a microphone array, the speaker's distance from the microphone array, or both, based on the microphone signals.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Locating one or more speakers or other sound sources may affect electronic communication that conveys sound that is converted into electrical or operational signals, such as in systems that use microphone arrays or distributed microphones. The intelligibility of speech signals that represent user utterance through hands-free sets may depend on accurate speaker localization. If an accurate localization fails, the transmitted speech signal may exhibit a low signal-to-noise ratio (SNR) and may be corrupted by some undesired change caused by a noise source that may be located in the vicinity of the speaker.

Audio and video conferences may benefit from accurate localization of one or more speakers. Introducing a directionality of the voice pick-up may improve the ability to pick up voices and other relevant audio signals with great clarity while substantially eliminating irrelevant background noise (e.g., air conditioning system or localized perturbation sources).

A method may more reliably localize a speaker. The method may not depend on the speaker's actual utterances, thus, the method may locate a speaker before the speaker has spoken a single word. In a speech recognition and speech control context, speaker localization may be important to provide a speech recognition device with speech signals having a high signal-to-noise ratio The method may be implemented without significant costs in communication systems that include one or more loudspeakers and a device that converts sound waves into electrical or operational signals. The input device may be a microphone array that detects sound in audio or video conference rooms or living rooms. The rooms may include an advanced voice control for a high fidelity (HIFI) device. Hands-free sets may also include a loudspeaker and a microphone array and may be programmed with the disclosed method.

Figure 1:
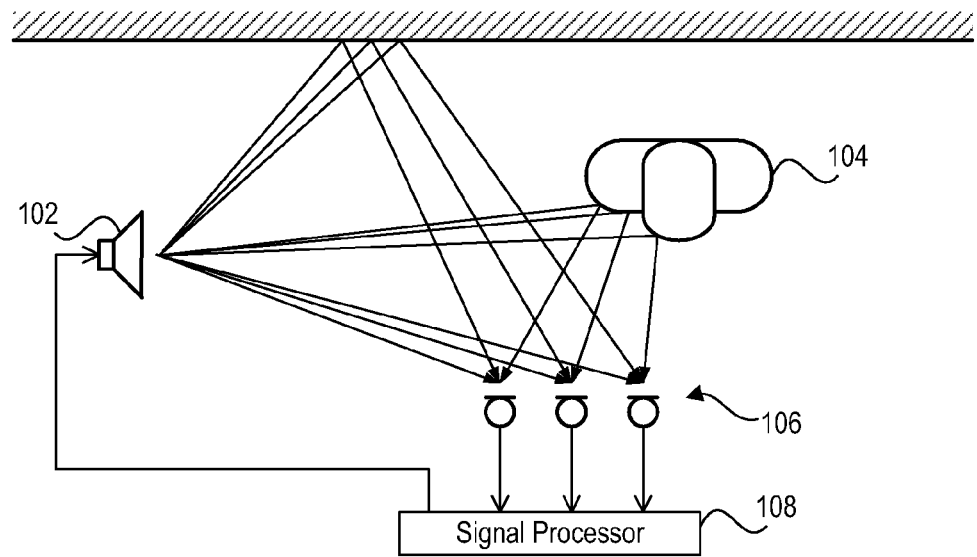
FIG. 1 illustrates reflections and reception of sound output by a loudspeaker.
Figure 2:
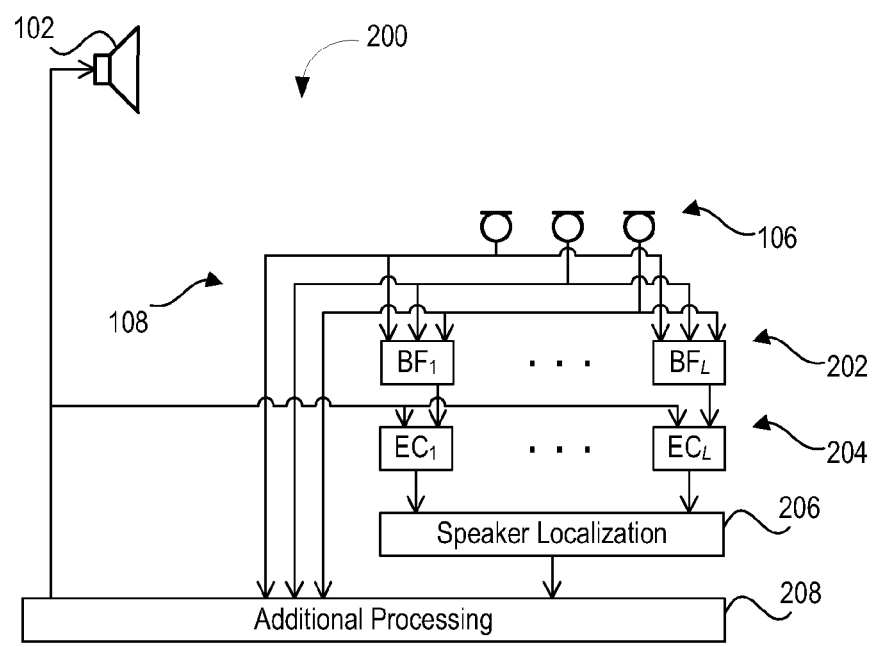
FIG. 2 is a first acoustic speaker localization system.
Figure 4:
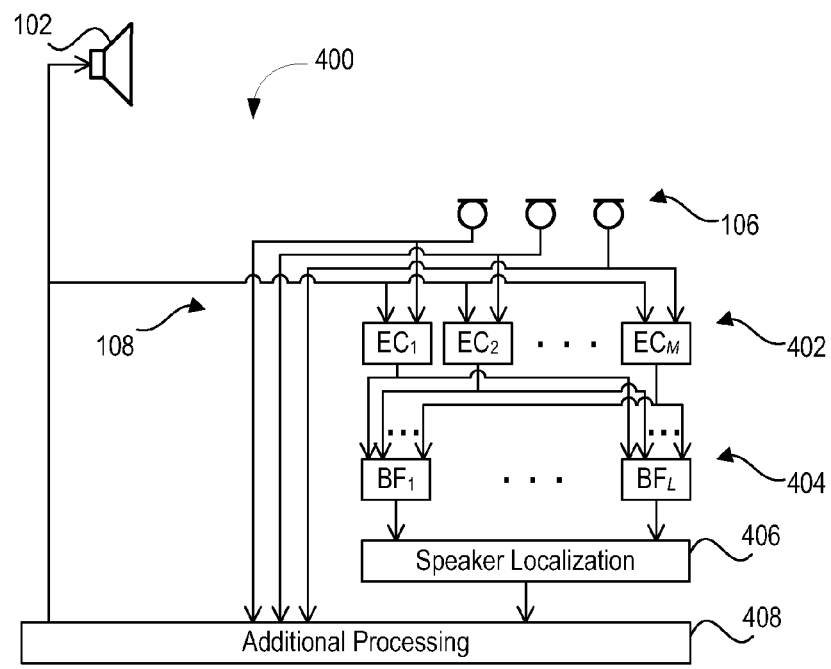
FIG. 4 is a second acoustic speaker localization system.
Figure 5:
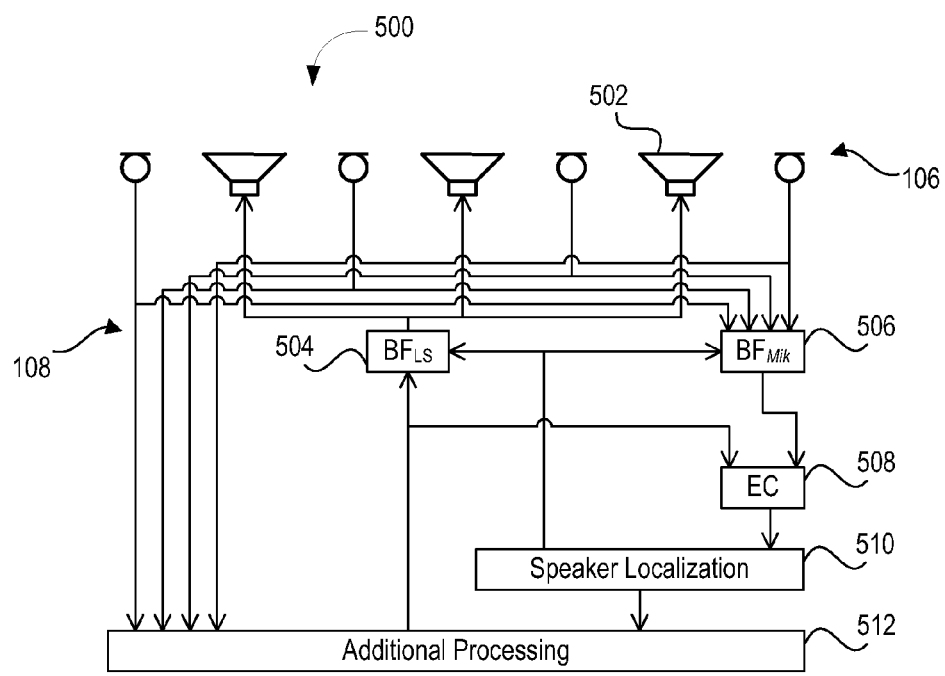
FIG. 5 is a third acoustic speaker localization system.

FIG. 1 shows reflections and reception of sound produced by a loudspeaker 102 within a room. The loudspeaker 102 produces an acoustic signal or a sound output. The sound may reflect off of various objects within the room, such as a wall or a speaker's body 104. A microphone array 106 may detect and receive the reflected signals. The microphone array may receive some acoustic signal directly from the loudspeaker 102. The microphone array 106 may include one or more microphones. Each microphone may convert sound into an output microphone signal that may be converted into a digital and/or analog format. The microphone signal may represent the detected sound to a signal processor 108. Some components of the signal processor 108 are shown in FIGS. 2, 4, and 5.

The sound radiated by the loudspeaker 102 may represent a speech from a remote party. In some applications the speech output may originate from a voice command module or a distant video conference party. In other applications the sound may not be heard because it may lie in an inaudible range. The sound may lie above about 20 kHz.

Acoustic localization of a speaker may be based on the measurement of transmission time differences between sound waves from a common acoustic source. The detection may determine the direction or relative direction of the acoustic source. The determination of the distance of the acoustic source may be more difficult if it is positioned in a far field of a receiver array. In some applications a larger spatial dimension of the array or distributed microphones may aid in detecting the distance. Microphone arrays may be used in combination with beamformers or beamforming methods to localize an acoustic source, for example, in an audio conference room. The beamformers or beamforming methods may combine the individual microphone signals obtained by the microphones that make up the microphone array to amplify signals from a preferred direction and/or to steer a sharp null towards an offending noise source.

The position of the speaker may be determined by the detection of the sound or acoustic signal output by one or more loudspeakers and reflected by the body of the speaker. The reflections may arrive at the microphone array after different sound transit times and/or from different directions. By detecting reflections of the sound emitted by the loudspeakers off a speaker's body, both the speaker's direction towards and distance from the microphone array may be determined. Thus, a "speaker" may not have to be speaking for localization to occur.

The localization of the speaker 104 may be completed before the speaker begins speaking. The parameters of the speech signal processing that may depend on the speaker's position (e.g., the steering angle of a beamformer) may be adapted before the speaker begins. Thus, the very beginning of the speaker's utterances may be transmitted to a remote party with a high SNR. In some systems a speech recognition device may be enabled to recognize the very beginning of a detected verbal utterance and more reliably process it.

More than one loudspeaker 102 may be used. The loudspeaker 102 may be an audio signal that is uncorrelated from the audio signals emitted from the other loudspeakers. For each of the emitted audio signals, the direction and distance of the speaker 104 may be determined from the reflections off the speaker's body 104. Average values may be determined from the results for each of the uncorrelated audio signals emitted by the multiple loudspeakers. No special signal may be required. For example, a signal from a remote party, such as an initial voice communication, or a music playback may be used. Thus, the localization may operate without notice by the user.

FIG. 2 is a first acoustic speaker localization system 200. The system 200 includes the loudspeaker 102 and the microphone array 106. The signal processor 108 includes beamformers 202, echo compensation filters 204, a speaker localizer 206, and processor 208 for additional processing. The loudspeaker 102 outputs audio signals that are directly and/or indirectly received by the microphone array 106. The microphone array 106 converts the received audio signals into microphone signals and sends the microphone signals to the beamformers 202.

The beamformers 202 process microphone signals detected and obtained by the microphone array 102. The beamformers 202 pass the processed microphone signals to the echo compensation filters 204. The beamformers 202 may be a delay-and-sum beamformer and/or a filter-and-sum beamformer. The beamformers 202 may process microphone signals $x_m(n)$ where n is the discrete time index of the microphone signals.

The beamformer 202 may perform beamforming in L directions thereby scanning a room in which the loudspeaker 102, the speaker 104, and the microphone array 106 are present. For example, the beamformer 202 may be a delay-and-sum beamformer that delays the individual microphone signals $x_m(n)$ (where n is the discrete time index) from M=3 microphones constituting the microphone array 106 such that phase balance is achieved for the respective direction of the directions L that may be considered. This beamformed signal is represented by:

$$x_{BF}(n) = \sum_{m=1}^{M} a_m x_m(n - d_m);$$

with weight factors $a_m$ and delay parameters $d_m$.

The beamformer 202 may be an adaptive weighted sum beamformer that combines pre-processed, time-delayed microphone signals $x_{T,m}$ of M microphones to obtain one output signal $Y_W$ with an improved SNR:

$$Y_W = \sum_{m=1}^{M} a_m x_{T,m}.$$

Beamforming may be temporally adapted when a speaker is moving. In this case, the weights $a_m$ are not time-independent as in a conventional delay-and-sum-beamformer. The weights $a_m$ may be recalculated repeatedly, e.g., to maintain sensitivity in the desired direction and to minimize sensitivity in the directions of noise sources. The weights $a_m$ may be recalculated to maintain suppression in a desired direction, such as in a direction of an undesired noise source.

The echo compensation filters 204 may estimate the impulse responses of the loudspeaker-room-microphone system for one or more of the beamformed signals in which case the speaker's direction towards and/or distance from the microphone array may be determined on the basis of the estimated impulse responses. Alternatively or additionally, the echo compensation filters 204 may estimate transfer functions for processing in Fourier space for a loudspeaker-room-microphone system for some of the beamformed signals. The impulse responses may measure the energy levels of sound coming from the different directions and, thus, allow for a reliable localization of the speaker.

Echo compensation filters 204 may determine impulse responses of a system including the loudspeaker and/or loudspeaker array 102, the room, and the microphone array 106 from the beamformed signals for each of the L directions. The echo compensation filter 204 sends the impulse responses to the speaker localizer 206. The speaker localizer 206 may compare the impulse responses of the loudspeaker-room-microphone system for each of the directions L to determine a distance and/or direction of the speaker.

When the system 200 directs the beamformer towards the loudspeaker 102, the acoustic signal output by the loudspeaker 102 may be directly detected and the impulse response is high. When the system 200 directs the beamformer towards the speaker 104, the impulse response represents the sound reflected by the speaker 104 towards the microphone array 106 and thereby indicates the directional angle of the speaker 106.

If the position of the loudspeaker 102 is known, the distance between the speaker 104 and the microphone array 106 may be derived by detecting the time lag of the impulse response for the direction towards the speaker 104 with respect to the impulse response for the direction towards the loudspeaker 102. The time lag, e.g. the difference in sound transit times, corresponds to the transit time of sound from the loudspeaker 102 to the speaker 104 and then to the microphone array 106. For example, if the loudspeaker 102 is located close to the microphone array 106, the distance of the speaker is derived from half of the transit time multiplied by the sound speed.

The speaker localizer 206 may pass the estimated or beamformed impulse responses that are within a certain frequency range but block or substantially attenuate signals above or below the pass-band. The filtering may obtain filtered impulse responses which may be used for determining respective energy responses. For instance, some frequency range of the impulse responses may be extracted by passing estimated or beamformed impulse responses through a bandpass filter for which the beamformer or beamforming process shows a high directionality. The directional resolution may be increased and, in addition, the computational load may be reduced.

The speaker localizer 206 may determine energy responses from the impulse responses estimated by the echo compensation filters 204 by calculating the squared magnitude of the impulse responses. Through these energy responses, a direction-distance diagram, such as the direction-diagram in FIG. 3, may be generated and properly used for the localization of the speaker. The energy responses may be plotted against an angular direction to which the microphone array is steered by the beamformer or beamforming process and the distance of a source of the detected sound waves, such as a reflection source, to the microphone array. The distance of the source of the sound waves to the microphone array may be derived from the sound speed and the time delays between different microphone signals received from different directions.

For example, the localization of the speaker may be determined through local maxima of the generated direction-distance diagram. The speaker localizer 206 may assign one of the local maxima to the speaker's position. Different local maxima may be present in the direction-distance diagram due to the loudspeaker and reflections off the speaker and/or walls of the room in which the speaker, the loudspeaker, and the microphone array are located. The stationary maxima may be determined before the speaker enters the range of the microphone array. For example, the stationary maxima may be determined when a speaker is not present in the room. A reference direction-distance diagram may be generated and stored in a local or remote memory representing the energy responses for the room without any speakers.

The speaker localizer 206 may generate a reference direction-distance diagram. The speaker localizer 206 may subtract the direction-distance diagram and the reference direction-distance diagram from each other to obtain a differential direction-distance diagram. The speaker's direction towards and/or distance from the microphone array may be determined on the basis of the differential direction-distance diagram, e.g., by determining the local maxima of the energy responses. The speaker localizer 206 may smooth the energy responses h(k) over k (e.g., within the impulse response interval, where k denotes the time index for the impulse response) to eliminate some fine structure which may be of no interest and may deteriorate the determination of local maxima.

In particular, the localization of the speaker 104 based on the impulse responses $h_l(k, n)$, where k is the discrete time index within the time interval of the impulse response, may be carried out as follows. For each direction l=1, . . . , L the energy responses are calculated $p_l(k, n)=|h_l(k, n)|^2$. The energy responses may be smoothed over k in time. Subsequently, the smoothed energy responses may be combined in a direction-time diagram or a direction-distance diagram. The direction-time diagram and the direction-distance diagram may be similar. Time and distance are related to each other by the sound's speed. Local maxima may be caused by objects that reflect sound, e.g., one or more speakers and the walls of the acoustic room.

Figure 3:
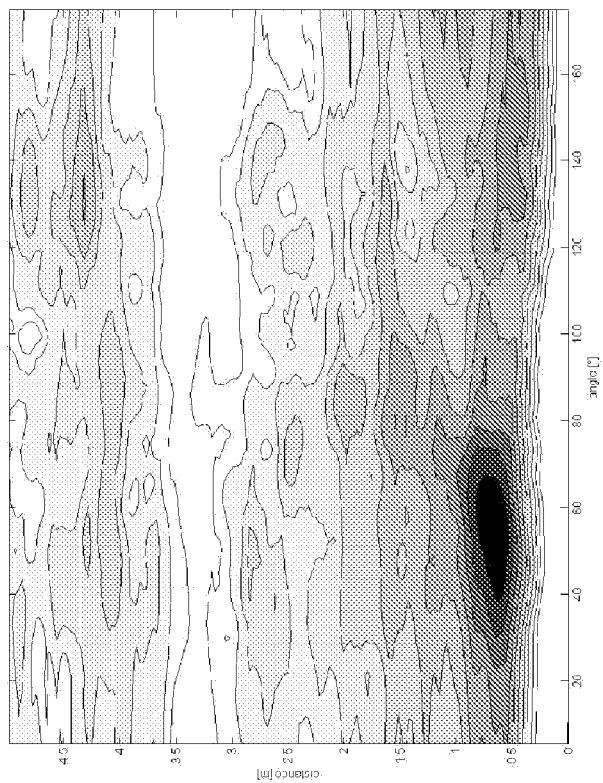
FIG. 3 is a distance-direction diagram.
Figure 3:
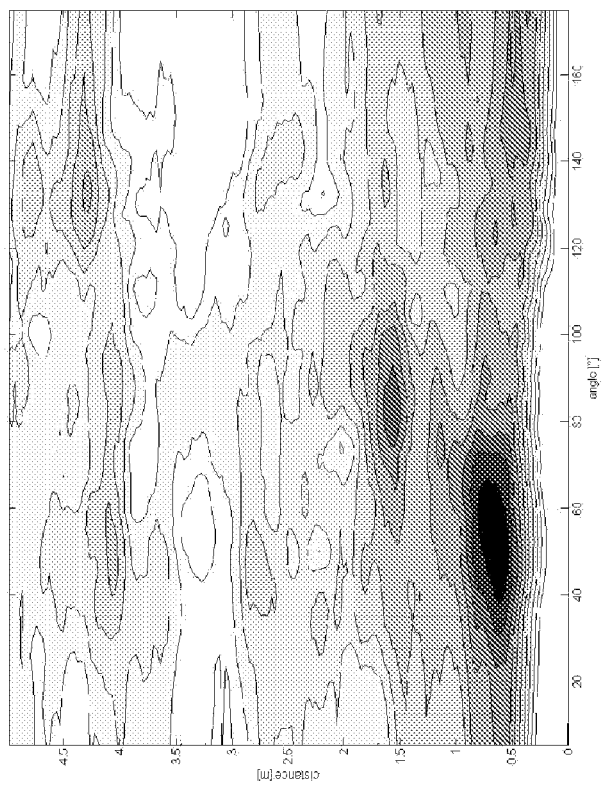

FIG. 3 is a distance-direction diagram. The diagram illustrates a loudspeaker 102 located at a distance of about 0.6 m at an angle of about 55° with respect to the microphone array 106. A speaker 104 located at a distance of about 1.6 m at an angle of about 80° with respect to the microphone array 106 may be identified. The speaker 104 may be identifiable as a distance and/or angle area on the diagram with a higher energy level of sound and/or a higher signal-to-noise ratio. Because a speaker 104 may also likely not be in a location identified as the loudspeaker, the area with the highest energy level may be disqualified as a location for the speaker 104. Alternatively or additionally, if the location of the loudspeaker is already known, then that area may also be disqualified.

Referring to FIG. 2, additional processing by a processor 208 may occur based on the microphone signals and/or the output of the unit for localization of the speaker 206. The steering angle of the beamformer 202 may be adjusted to the actual speaker's position as determined by the unit for localization of the speaker 206. Moreover, the loudspeaker and/or loudspeaker array 102 output may be adapted according to the determined speaker's position. For instance, the volume of the output may be controlled based on the speaker's position. Moreover, the sensitivity of the microphone array 106 may be changed based on the speaker's distance.

FIG. 4 is a second acoustic speaker localization system 400. The system 400 includes the loudspeaker and/or loudspeaker array 102 and the microphone array 106. The signal processor 108 includes echo compensation filters 402, beamformers 404, a speaker localizer 406, and a processor 408 for additional processing. The loudspeaker 102 outputs audio signals that are directly and/or indirectly received by the microphone array 106. The microphone array 106 converts the received audio signals into microphone signals and sends the microphone signals to the beamformers 202.

Echo compensation filters 402 determine impulse responses of a system including the loudspeakers and/or loudspeaker array 102, the room, and the microphone array 106 by processing the microphone signals. For example, the echo compensation filters 402 may receive impulse responses $h_m(k, n)$, where k is the discrete time index within the time interval of the impulse response, for M microphone signals. The echo compensation filter 402 may be adapted for each n. The impulse responses may be received for each of L directions. The echo compensation filter 402 sends the impulse responses to the beamformer 404.

The beamformer 404 spatially filters the impulse responses. The beamformer 404 may carry out some over-sampling for the signals to achieve a higher angle resolution. The beamformer 404 passes the beamformed impulse responses to the speaker localizer 406. The beamformers 404 may be a delay-and-sum beamformer and/or a filter-and-sum beamformer. For example, the beamformer 404 may process the impulse responses obtained by the echo compensation filter 402 to obtain:

$$h_l(k, n) = \sum_{m=1}^{M} a_m h_m(k - d_{m,l}, n), l = 1, \ldots, L.$$

Where L>M, less impulse responses may be estimated as compared to the system 200. For M microphone signals, L beamformed signals (M<L) might be obtained by applying the beamformer 404 to the impulse responses and/or the beamformed signals may be determined off-line (e.g., every few seconds). Moreover, the beamforming may be restricted to a time interval of the entire impulse response h(k), where k denotes the time index for the impulse response. For example, beamforming may be restricted to k∈[$k_{min}$, $k_{max}$], in which, e.g., $k_{min}$ is determined from the signal transit time for a sound wave that is radiated by the loudspeaker 102 directly (without reflections) to the microphone array 106 and $k_{max}$ is determined from the signal transit time for a sound wave that is radiated by the loudspeaker 102 and reflected by a distant wall in the room to the microphone array 106 (e.g., a maximum signal transit time).

The speaker localizer 406 may band-pass filter the estimated or beamformed impulse responses to obtain filtered impulse responses which may be used for determining the respective energy responses. Some frequency range of the impulse responses may be extracted by band-pass filtering for which the beamformer or beamforming process shows a high directionality. The directional resolution may be increased and, in addition, the computational load may be reduced.

The speaker localizer 406 may compare the beamformed impulse responses of the loudspeaker-room-microphone system for each of the directions L to determine the distance and/or direction of the speaker. The speaker localizer 406 may determine energy responses from the beamformed impulse responses by calculating the squared magnitude of the impulse responses. The speaker localizer 406 may generate a direction-distance diagram, such as the direction-diagram in FIG. 3, from these energy responses. The speaker localizer 406 may use the direction-distance diagram for the localization of the speaker. The energy responses may be plotted against an angular direction to which the microphone array is steered by the beamformer 404 and the distance of a source of the detected sound waves, such as a reflection source, to the microphone array 106. The distance of the source of the sound waves to the microphone array may be derived from the sound's speed and the transmission delays of different microphone signals for different directions. The speaker localizer 406 may generate a differential direction-distance diagram.

For example, the localization of the speaker may be achieved by determining local maxima of the generated direction-distance diagram and/or differential direction-distance diagram and assigning one of the local maxima to the speaker's position. Different local maxima may be present in the direction-distance diagram due to the loudspeaker and/or reflections off the speaker and/or walls of the room where the speaker, the loudspeaker, and the microphone array are located. The stationary maxima may be determined at a predetermined time and subtracted out.

Based on the microphone signals and/or the output of the unit for localization of the speaker 406, additional processing by a processor 408 may occur. The steering angle of the beamformer 404 may be adjusted to the speaker's position as determined by the unit for localization of the speaker 406. The output by the loudspeaker 102 may be adapted according to the determined speaker's position. For instance, the volume of the output sound may be controlled depending on the speaker's position. Moreover, the sensitivity of the microphone array 106 may be adapted in accordance with the determined speaker's distance.

FIG. 5 is a third acoustic speaker localization system 500. The system 500 includes a loudspeaker array 502 and the microphone array 106. The signal processor 108 includes a beamformer for the loudspeaker 504, a beamformer for the microphones 506, an echo compensation filter 508, a speaker localizer 510, and a processor 512 for additional processing. The loudspeaker array 502 outputs audio signals that are directly and/or indirectly received by the microphone array 106. The microphone array 106 converts the received audio signals into microphone signals and sends the microphone signals to the beamformer 506.

The beamformer loudspeaker 504 directs the loudspeaker array 502 to sequentially radiate sound at different directions. The microphone array 106 may be beamformed in the same or substantially similar direction as the loudspeaker array 502 by the microphone beamformer 506. Thus, at each time n one direction may be examined and a range of angular directions may be sequentially scanned by the loudspeaker beamformer 504 and the microphone beamformer 506. The respective microphone signals may exhibit less noise from directions other than the respective predetermined direction. However, the sound output of the loudspeaker array may be artificially modified through the control of the loudspeaker beamformer 504. Beamforming the output of the audio signal may be restricted to a very narrow frequency range. Alternatively or additionally, the beamformer 504 may output an inaudible audio signal to localize the speaker.

At each discrete time n (where n is the discrete time index of the microphone signals) one single direction may be examined and spatial scanning may be performed by a simultaneous or substantially simultaneous steering of both the loudspeaker array 502 and the microphone array 106 by their respective beamformers 504 and 506. In one example, the loudspeaker and microphone arrays 502 and 106 may be arranged along the same vertical axis. The loudspeaker and microphone arrays 502 and 106 may scan the acoustic room in the horizontal direction. The beamformed microphone signals may include directly arriving or reflected sound from the respective direction of origin of the sound. The directly arriving or reflected sound may be of a greater magnitude than the contribution of sound coming from other directions. The energy responses may be determined and a distance-direction diagram and/or a differential distance-direction diagram may be generated on the basis of the estimated or beamformed impulse responses to localize the speaker.

The sound or audio signal output by any of the loudspeakers may be in an inaudible range (e.g., a frequency above 20 kHz or below about 20 Hz). The use of an inaudible sound may be compatible with a steerable loudspeaker array, since the control of different directions of output sound may give rise to an artificial listening experience (e.g., when listening to musical or voice output conveyed by the loudspeakers). The sound from the loudspeaker or loudspeaker array 502 may be an audio signal that is uncorrelated from the audio signals emitted from the other loudspeakers.

The speaker localizer 510 may band-pass filter the beamformed impulse responses to obtain filtered impulse responses which may be used to determine the respective energy responses. For instance, some frequency range of the impulse responses may be extracted by a band-pass filter for which the beamformer or beamforming process shows a high directionality. The directional resolution may be increased and, in addition, the computational load may be reduced.

The speaker localizer 510 may compare the beamformed impulse responses of the loudspeaker-room-microphone system for each of the directions L to determine the distance and/or direction of the speaker. The speaker localizer 510 may determine energy responses from the beamformed impulse responses by calculating the squared magnitude of the impulse responses. The speaker localizer 510 may generate a direction-distance diagram, such as the direction-diagram in FIG. 3, from these energy responses. The speaker localizer 510 may use the direction-distance diagram to localize the speaker. The energy responses may be plotted against an angular direction that the microphone array is steered to by the beamformer 506 and the distance of a source of the detected sound waves (such as a reflection source) to the microphone array 106. The distance of the source of the sound waves to the microphone array may be derived from the speed of the sound and the time delays between different microphone signals for different directions. The speaker localizer 406 may generate a differential direction-distance diagram.

The localization of the speaker may be achieved by determining the local maxima of the generated direction-distance diagram and/or differential direction-distance diagram and assigning one of the local maxima to the speaker's position. Different local maxima may be present in the direction-distance diagram due to the loudspeaker and/or reflections off the speaker and/or reflections off the walls of the room where the speaker, the loudspeaker, and the microphone array are located. The stationary maxima may be determined at a predetermined time and subtracted out.

Based on the microphone signals and/or the output of the unit for localization of the speaker 510, additional processing by a processor 512 may occur. For instance, the steering angle of the beamformer 506 may be adjusted to the speaker's position as determined by the unit for localization of the speaker 510. Moreover, the output by the loudspeaker 502 may be adapted according to the determined speaker's position. For instance, the volume level of the output may be controlled based on the speaker's position. Moreover, the sensitivity of the microphone array 106 may be changed based on the speaker's distance.

Figure 6:
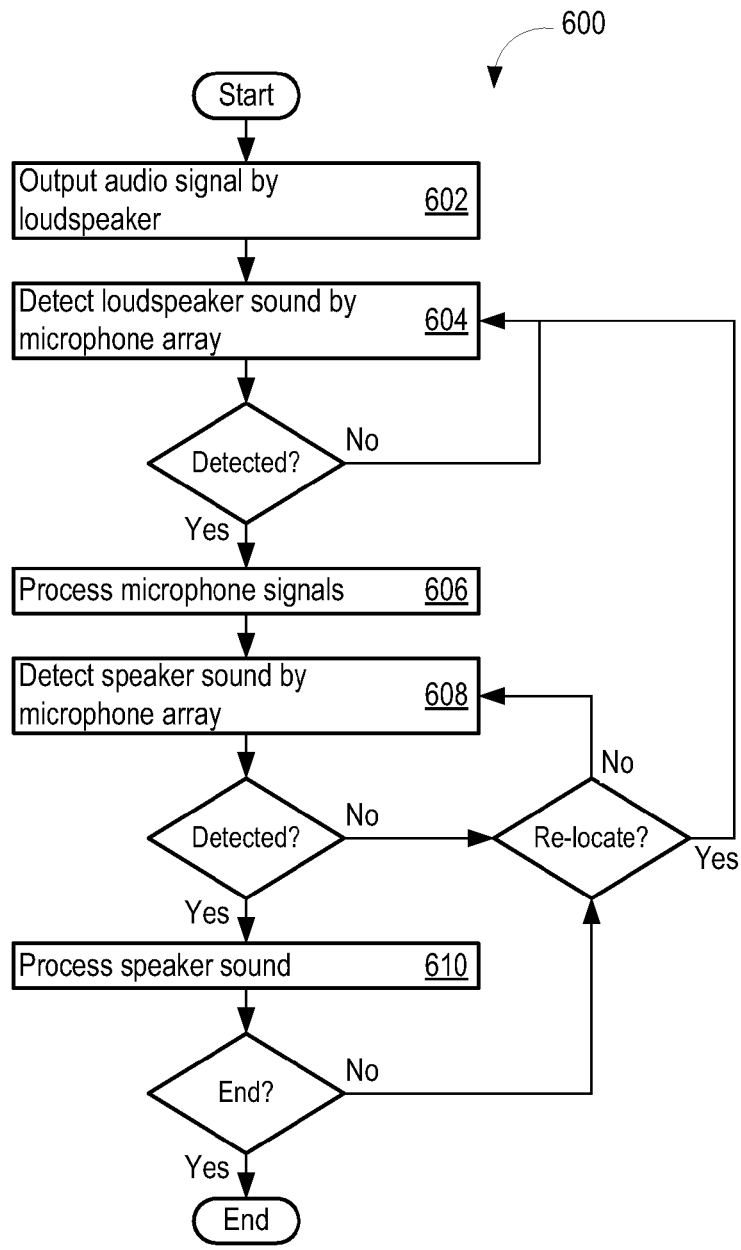
FIG. 6 is a first flow diagram of an acoustic speaker localization process.

FIG. 6 is a process 600 for acoustic localization of a speaker. The process 600 directs a loudspeaker to output an audio signal or sound (602). The audio signal may be a speech output, such as the voice of a remote communication party or a voice from a voice command module. The audio signal or sound may be a tone with a single frequency, or a multitude of frequencies. For example, the audio signal may be an inaudible tone having a single or multiple frequencies above 20 kHz. The audio signal may vary in time and may be a pulsed signal and/or be broadcast or transmitted in a time-varying pattern.

The process 600 may direct multiple loudspeakers, such as a loudspeaker array, to output an audio signal or sound. The audio signals or sounds may be a shared (e.g., common) audio signal or sound, or they may differ in frequency. For example, each loudspeaker in a loudspeaker array may broadcast a signal at a single frequency different from the signal frequencies broadcast by the other loudspeakers in the array. The sound emitted from the loudspeaker or loudspeaker array may be uncorrelated from the audio signals emitted from the other loudspeakers.

A microphone array detects the audio signal or sound (604). The audio signal or sound may be radiated directly from the loudspeaker to the microphone array. The sound may be reflected from one or a plurality of objects, including walls and/or a speaker, before arriving at the microphone array. The microphone array may detect other audio signals or sounds. For example, the microphone array may detect undesired noises or other acoustic sources. The microphone array may convert these audio signals into microphone signals.

If the microphone array does not detect an audio signal, or alternatively does not detect a desired audio signal, the array may maintain a temporary state of suspension during which the detection of the audio signal may interrupt or awaken it. When awakened or active, the method 600 may process the microphone signals (606). The processing 606 may include beamforming, echo compensation filtering, band-pass filtering, impulse response generation and/or estimation, distance-direction diagram creation, speaker localization processing, local maxima determining, beam steering, and/or output volume adjustment, among other actions.

The microphone array may detect a speaker sound based on the processed microphone signals (608). For example, the processed microphone signals may indicate a direction and distance of the speaker based on sounds from the loudspeaker reflected from the speaker, and the processor may tune the microphone array to capture sounds from the speaker's direction and location. Once the speaker begins originating speaker sounds, such as when an orator begins orating or a video conference participant begins speaking, the microphone array may be tuned to detect those sounds.

If sounds are not detected, the process 600 may attempt to re-locate the speaker. For example, if a sufficient amount of time has passed such that the speaker may have moved from the previously determined direction and distance, the process 600 may use the loudspeaker array to locate the speaker. Alternatively, the process 600 may continue to monitor for speaker sound.

When speaker sounds are detected, the speaker sounds may be processed (610). For example, the speaker sounds may be amplified and re-broadcast. Alternatively or additionally, the speaker sounds may be transmitted to a remote location, such as in a video conferencing setting. The speaker sounds may be processed with a voice command module where a system performs actions based on the processed voice commands. For example, a hands-free set in a vehicle may recognize voice commands from the driver of the vehicle and update a vehicle navigation display, adjust media transmitted through loudspeakers, or place a telephone call, correspondingly. The process 600 may then attempt to detect more speaker sounds for processing, attempt to re-locate the speaker, or terminate the process.

Figure 7:
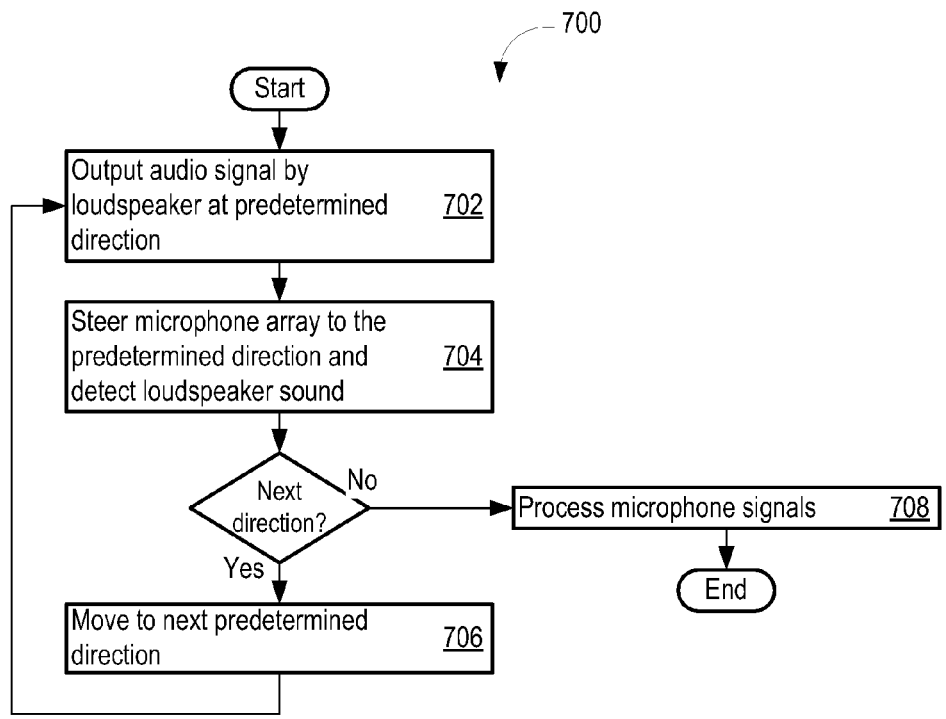
FIG. 7 is a second flow diagram of an acoustic speaker localization process.

FIG. 7 is a second process 700 for acoustic localization of a speaker. The process 700 directs a loudspeaker and/or a loudspeaker array to output an audio signal or sound at a predetermined direction (702). The predetermined direction may be directed by a loudspeaker beamformer. For example, a loudspeaker array may output a tone at a frequency above about 20 kHz at an angle of about 20°. The predetermined direction may be a direction previously found to include a speaker. The predetermined direction may avoid known undesired noise or acoustic sources. The predetermined direction may be the first or subsequent direction in a series of directions for a spatial scanning of an acoustic room.

A microphone array receives the audio signal or sound output by the loudspeaker array or loudspeaker (704). The microphone array may be steered towards the audio signal or sound by a microphone array beamformer. For example, the beamformer may steer the microphone array in a direction previously determined to include a speaker. Alternatively or additionally, the predetermined direction may avoid known undesired noise or acoustic sources. The microphone array and loudspeaker array may be arranged such that the beamformer may steer the microphone array to the same predetermined direction as the loudspeaker array.

If another direction should be processed, the process 700 may move to the next predetermined direction (706) and output another audio signal. The next predetermined direction may be a sequential or programmed direction for a spatial scanning of an acoustic room. A next direction may be a projected direction in the path of a moving speaker. If no further directions need be processed, the microphone signals may be processed (708), and then the process may terminate. The processing 708 may include beamforming, echo compensation filtering, band-pass filtering, impulse response generation and/or estimation, distance-direction diagram creation, speaker localization processing, local maxima determining, beam steering, and/or output volume adjusting, among other actions. Alternatively or additionally, the process 700 may detect a speaker sound and/or process a speaker sound based on the processed microphone signals.

Figure 8:
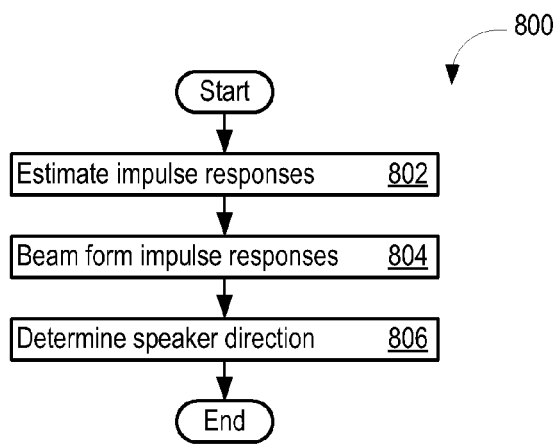
FIG. 8 is a first flow diagram of a microphone signal processing process.

FIG. 8 is a process 800 for processing a microphone signal. The process 800 includes estimating an impulse response (802). An echo compensation filter may obtain microphone array impulse responses from microphone signals obtained by a microphone array. The impulse responses may be described as $h_m(k, n)$, where k is the discrete time index within the time interval of the impulse response. An impulse response may be obtained for M microphone signals.

The impulse responses are beamformed (804). For example, the impulse responses may be spatially filtered and/or oversampled. The beamforming may occur after a delay (e.g., not in real-time), instead operating at predetermined intervals (e.g., every few seconds). The beamformed impulse responses may be in the form:

$$h_l(k, n) = \sum_{m=1}^{M} a_m h_m(k - d_{m,l}, n), \; l = 1, \ldots, L.$$

A speaker direction is determined from the impulse responses (806). For example, a distance-direction diagram may be created and a local maximum may be determined. The determination 806 may include filtering or passing signals that are within a certain frequency range, energy response calculating, temporal smoothing, and/or reference distance-direction diagram creation.

Figure 9:
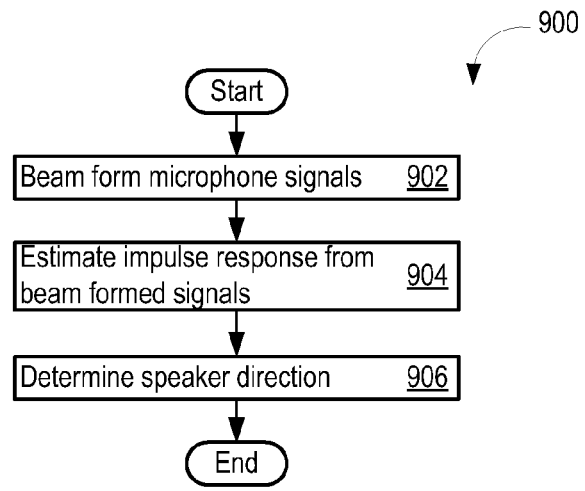
FIG. 9 is a second flow diagram of a microphone signal processing process.

FIG. 9 is a second process 900 for processing a microphone signal. The process 900 beamforms the microphone signal (902). The beamforming may be a delay-and-sum beamforming and/or a filter-and-sum beamforming and/or an adaptive weighted sum beamforming. The beamforming may occur for each of L directions and/or be determined off-line. The beamforming may be temporally adapted and/or restricted to a time interval. The beamformed signal may be in the form:

$$x_{BF}(n) = \sum_{m=1}^{M} a_m x_m(n - d_m).$$

Impulse responses are estimated from the beamformed signals (904). The estimation may be performed by echo compensation filters. The impulse responses may reflect a loudspeaker-room-microphone system and/or energy levels of sound coming from different directions.

A speaker direction is determined from the estimated impulse responses (906). A distance-direction diagram or difference distance-direction diagram may be created, and a local maximum may be determined. The determination 906 may include filtering or passing signals that are within a certain frequency range, energy response calculating, temporal smoothing, and/or reference distance-direction diagram creation.

Figure 10:
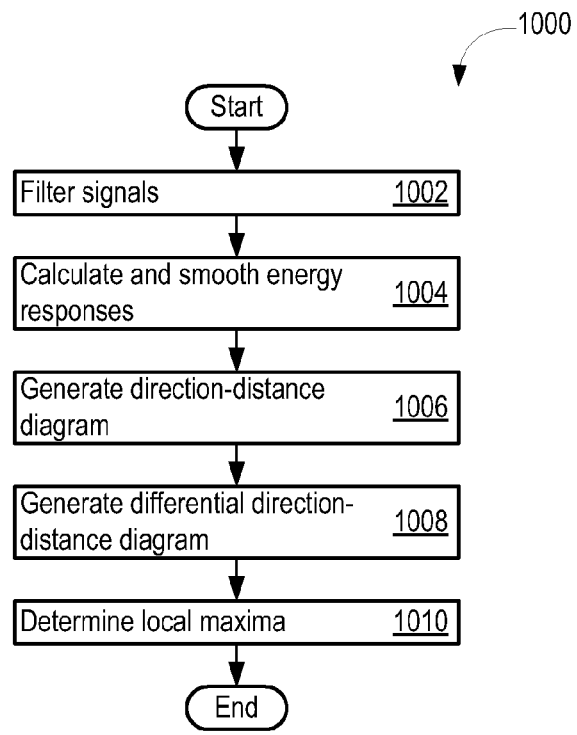
FIG. 10 is a flow diagram of a speaker direction determination process.

FIG. 10 is a process 1000 for determining a speaker direction. The process 1000 includes optionally filtering the signals (1002). For example, the signals may be band-pass filtered. Energy responses are calculated for the signals (1004). The energy responses may be calculated by squaring the magnitude of the impulse responses. The energy responses may be smoothed to eliminate fine structures.

A direction-distance diagram is generated (1006). For example, a reference direction-distance diagram may be generated when a speaker is not present. A direction-distance diagram may be generated when one or more speakers are present and reflected loudspeaker audio signals are detected. The direction-distance diagram may be obtained by plotting the energy responses against an angular direction at which the microphone array and/or the loudspeaker or loudspeaker array was steered. A differential direction-distance diagram may be optionally generated by subtracting a direction-distance diagram from a reference direction-distance diagram (1008).

Local maxima or a local maximum may be calculated from the direction-distance diagram and/or a differential direction-distance diagram (1010). In the direction-distance diagram and/or differential direction-distance diagram local maxima of the smoothed energy responses may localize one or more speakers by the distance from and the angular direction towards the microphone array.

The above described method may be implemented in hands-free sets. The signal processing may be performed in real time, including the beamforming process and the estimating of the impulse responses. Estimation of the impulses responses of the loudspeaker-room-microphone system (e.g. by echo compensation filtering devices or methods) may be based on audio signals received by one or more loudspeakers. The localization of the speaker may be performed at a predetermined time by reading the estimated impulse responses (which are determined in real time and may be buffered) and, e.g., generating a direction-distance diagram or a differential direction-distance diagram based on the read impulse responses.

The method or system may be part of a hands-free set, audio or video conference system, a speech controller, or a speech recognition system. Through speaker localization the operation may be improved. For instance, a microphone sensitivity and output volume of a hands-free set may be adjusted based on a speaker's position. Moreover, a more reliable speech controller or a speech recognition system may be improved by steering a microphone array towards the speaker's position. The repositioned array may enhance the quality of the detected speech signal representing a speaker's utterance.

The methods and descriptions of FIGS. 6-10 may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment and/or comfort controller or types of non-volatile or volatile memory remote from or resident to a hands free or conference system. The memory may retain an ordered listing of executable instructions for implementing logical functions. A logical function may be implemented through digital circuitry, through source code retained in a tangible media, through analog circuitry, or through an analog source such as source that may process analog electrical or audio signals. The software may be embodied in any computer-readable medium or signal-bearing medium, for use by, or in connection with an instruction executable system, apparatus, device, resident to a hands-free system, a communication system, a home, mobile (e.g., vehicle), portable, or non-portable audio system. Alternatively, the software may be embodied in media players (including portable media players) and/or recorders, audio visual or public address systems, computing systems, etc. Such a system may include a computer-based system, a processor-containing system that includes an input and output interface that may communicate through a physical or wireless communication bus to a local or remote destination or server.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more wires, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for localizing a speaker in a room in which at least one loudspeaker and at least one microphone array are located, the method comprising:
   outputting sound by the at least one loudspeaker such that the sound is at least partly reflected by the speaker;
   detecting the sound output by the at least one loudspeaker and at least partly reflected by the speaker by the microphone array to obtain a microphone signal; and
   determining the speaker's direction towards and/or distance from the microphone array based on the microphone signals.

2. The method according to claim 1, further comprising beamforming the microphone signals to obtain at least one beamformed signal, and where the speaker's direction towards or distance from the microphone array is determined based on the at least one beamformed signal.

3. The method according to claim 2, further comprising estimating impulse responses of a system comprising the at least one loudspeaker, the room, and the microphone array for at least some of the beamformed signals, and where the speaker's direction towards or distance from the microphone array is determined based on the estimated impulse responses.

4. The method according to claim 1, wherein the sound is sequentially output by a loudspeaker array in a respective one of a number of predetermined directions; and where the microphone array is steered to a respective one of a number of predetermined directions to obtain a beamformed signal for the respective one of the predetermined directions; and the method further comprising:
   estimating impulse responses of a system comprising the loudspeaker array, the room, and the microphone array for at least some of the beamformed signals, and where the speaker's direction towards or distance from the microphone array is determined based on the estimated impulse responses.

5. The method according to claim 1, further comprising:
   estimating the impulse responses of a system comprising the at least one loudspeaker, the room, and the microphone array for at least some of the microphone signals; and
   beamforming the estimated impulse responses to obtain at least one beamformed impulse response, and where the speaker's direction towards or distance from the microphone array is determined based on the at least one beamformed impulse response.

6. The method according to claim 3, further comprising:
   determining energy responses from the estimated impulse responses; and
   generating a direction-distance diagram based on the determined energy responses, and where the speaker's direction towards or distance from the microphone array is determined based on the direction-distance diagram.

7. The method according to claim 5, further comprising:
   determining energy responses from the beamformed impulse responses; and
   generating a direction-distance diagram based on the determined energy responses, and where the speaker's direction towards or distance from the microphone array is determined based on the direction-distance diagram.

8. The method according to claim 6, further comprising passing the estimated impulse responses within a frequency range to obtain filtered impulse responses, and where the energy responses are determined from the filtered impulse responses.

9. The method according to claim 7, further comprising passing the beamformed impulse responses within a frequency band to obtain filtered beamformed impulse responses, and where the energy responses are determined from the filtered beamformed impulse responses.

10. The method according to claim 6, further comprising determining local maxima of the direction-distance diagram, and where the speaker's direction towards and/or distance from the microphone array is determined based on the determined local maxima.

11. The method according to claim 6, further comprising generating a reference direction-distance diagram and subtracting the direction-distance diagram and the reference direction-distance diagram from each other to obtain a differential direction-distance diagram, and where the speaker's direction towards or distance from the microphone array is determined based on the differential direction-distance diagram.

12. The method according to claim 11, further comprising determining local maxima of the differential direction-distance diagram; and where the speaker's direction towards or distance from the microphone array is determined based on the determined local maxima.

13. The method of claim 1, further comprising:
   detecting vocalization sounds including sounds generated by the speaker based on the speaker's direction towards and/or distance from the microphone array; and
   processing the vocalization sounds.

14. The method of claim 1, where processing the vocalization sounds includes performing voice recognition on the vocalization sounds.

* * * * *